US012689079B2

(12) United States Patent
Matsuda et al.

(10) Patent No.: US 12,689,079 B2
(45) Date of Patent: Jul. 21, 2026

(54) BATTERY PACK AND VEHICLE

(71) Applicant: TOYOTA JIDOSHA KABUSHIKI KAISHA, Toyota (JP)

(72) Inventors: Ryo Matsuda, Toyota (JP); Yoshihiko Hiroe, Toyota (JP); Taro Matsushita, Toyokawa (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 663 days.

(21) Appl. No.: 18/200,949

(22) Filed: May 23, 2023

(65) Prior Publication Data

US 2023/0411738 A1    Dec. 21, 2023

(30) Foreign Application Priority Data

May 26, 2022    (JP) ................................. 2022-086303

(51) Int. Cl.
  H01M 10/658 (2014.01)
  H01M 50/209 (2021.01)
  H01M 50/289 (2021.01)
(52) U.S. Cl.
  CPC ....... H01M 10/658 (2015.04); H01M 50/209 (2021.01); H01M 50/289 (2021.01); *H01M 2220/20* (2013.01)
(58) Field of Classification Search
  CPC .................................................. H01M 10/658
  See application file for complete search history.

(56) References Cited

U.S. PATENT DOCUMENTS

| | | | | |
|---|---|---|---|---|
| 2020/0343495 A1* | 10/2020 | Kritzer | ................ | H01M 10/653 |
| 2022/0077542 A1* | 3/2022 | Yoshida | .............. | H01M 50/291 |
| 2023/0163381 A1* | 5/2023 | Su | ........................ | H01M 10/658 |
| | | | | 429/120 |
| 2023/0411755 A1* | 12/2023 | Ju | ........................ | H01M 50/209 |
| 2024/0120573 A1* | 4/2024 | Sasaki | .............. | H01M 10/6555 |

FOREIGN PATENT DOCUMENTS

| | | |
|---|---|---|
| JP | 2000-228228 A | 8/2000 |
| JP | 2015-211013 A | 11/2015 |
| JP | 2018-001963 A | 1/2018 |
| JP | 2020-187859 A | 11/2020 |

* cited by examiner

*Primary Examiner* — Maria Laios
(74) *Attorney, Agent, or Firm* — Dinsmore & Shohl LLP

(57)    ABSTRACT

A battery pack includes a plurality of battery cells and a plurality of separator portions. The battery cells are stacked together in a first direction and each configured to include a first end portion located at one end in a second direction orthogonal to the first direction, a second end portion located at the other end in the second direction, and an intermediate portion provided between the first end portion and the second end portion. The separator portions each include a heat insulating member provided between the intermediate portions adjacent to each other in the first direction and a first shielding plate provided between the first end portions adjacent to each other in the first direction, and are each provided between the battery cells adjacent to each other.

12 Claims, 4 Drawing Sheets

BATTERY PACK AND VEHICLE

CROSS-REFERENCE TO RELATED APPLICATION

This application claims priority to Japanese Patent Application No. 2022-086303 filed on May 26, 2022, incorporated herein by reference in its entirety.

BACKGROUND

1. Technical Field

The present disclosure relates to a battery pack and a vehicle.

2. Description of Related Art

Japanese Unexamined Patent Application Publication No. 2020-187859 (JP 2020-187859 A) discloses a battery pack in which a plurality of secondary batteries is disposed side by side in a predetermined direction. The battery pack includes a heat insulating sheet disposed between the secondary batteries adjacent to each other in the predetermined direction.

SUMMARY

However, JP 2020-187859 A does not give any consideration to suppression of the size of the heat insulating sheet (heat insulating member). Reduction of the size of the heat insulating member is effective for reducing the weight and cost of the battery pack. Therefore, it is desired to suppress the size of the heat insulating sheet from becoming large.

The present disclosure has been made to solve the above issue, and an object thereof is to provide a battery pack and a vehicle capable of suppressing a heat insulating member from becoming large.

A battery pack according to a first aspect of the present disclosure includes a plurality of battery cells and a plurality of separator portions. The battery cells are stacked together in a first direction and each configured to include a first end portion located at one end in a second direction orthogonal to the first direction, a second end portion located at the other end in the second direction, and an intermediate portion provided between the first end portion and the second end portion. The separator portions each include a heat insulating member provided between the intermediate portions adjacent to each other in the first direction and a first shielding plate provided between the first end portions adjacent to each other in the first direction, and are each provided between the battery cells adjacent to each other.

In the battery pack according to the first aspect of the present disclosure, as described above, each of the separator portions includes the heat insulating member provided between the intermediate portions adjacent to each other in the first direction, and the first shielding plate provided between the first end portions adjacent to each other in the first direction. According to such a configuration, it is possible to suppress the size of the heat insulating member from becoming large (suppress an increase in the amount of the heat insulating member) as compared with the case where the heat insulating member is also provided between the first end portions adjacent to each other in the first direction.

In the battery pack according to the first aspect above, the first shielding plate has a thermal resistance smaller than a thermal resistance of the heat insulating member.

In the battery pack according to the first aspect above, the intermediate portion may include a flat portion with a constant width in the first direction, the first end portion may include a narrow portion with a smaller width than a width of the flat portion in the first direction, and the first shielding plate may be provided between the narrow portions adjacent to each other in the first direction. According to such a configuration, it is possible to suppress the size of the heat insulating member from becoming large (suppress an increase in the amount of the heat insulating member) as compared with the case where the heat insulating member is spread between the narrow portions (the space between the narrow portions is filled with the heat insulating member).

The battery pack according to the first aspect above may further include a case that accommodates the battery cells. The first shielding plate may be configured to be in contact with the case at an end portion in the second direction. According to such a configuration, when the temperature of the first shielding plate rises due to radiant heat from the battery cells, the heat of the first shielding plate can be easily transferred (released) to the case. It should be noted that the emissivity represents the easiness of thermal radiation (heat transfer) from an object.

The battery pack according to the first aspect above may further include an elastic body that brings the second end portion and the case into contact with each other so as to be thermally conductive.

In the battery pack according to the first aspect above, the first shielding plate may include a first surface provided so as to face toward the battery cell provided at a center in the first direction among the battery cells, and a second surface opposite to the first surface. An emissivity of the second surface may be larger than an emissivity of the first surface.

When viewed from each of the battery cells (the battery cells other than the battery cell at the center), the number of battery cells provided closer to the battery cell provided at the center in the first direction is larger than the number of battery cells provided on the opposite side. Specifically, in the case where five battery cells are disposed side by side in the right-left direction, for example, when viewed from the second battery cell from the left, three battery cells are provided on the center side (on the right side), and on the contrary, only one battery cell is provided on the opposite side (on the left side). Therefore, a heat capacity (heat capacity of the battery cell) closer to the battery cell provided at the center in the first direction when viewed from each of the battery cells is larger as compared with the opposite side. According to such a configuration, making the emissivity of the second surface larger than that of the first surface makes it possible to more efficiently transfer the heat to the center side where the heat capacity is larger.

In the battery pack according to the first aspect above, the first shielding plate and the first end portion adjacent to each other in the first direction may be separated from each other. According to such a configuration, it is possible to suppress the heat of the first shielding plate from transferring to the battery cell (the first end portion).

In the battery pack according to the first aspect above, the first shielding plate may be configured such that a thickness of the first shielding plate is smaller than a thickness of the heat insulating member.

In the battery pack according to the first aspect above, the first shielding plate and at least one of two of the first end portions adjacent to the first shielding plate in the first direction may be in contact with each other.

In the battery pack according to the first aspect above, the heat insulating member and the first shielding plate may be in contact with each other in each of the separator portions. According to such a configuration, the heat transferred from the battery cells to the heat insulating member can be transferred (released) to the first shielding plate.

In the battery pack according to the first aspect above, each of the separator portions may include a second shielding plate provided between the second end portions adjacent to each other in the first direction. According to such a configuration, it is possible to suppress the size of the heat insulating member from becoming large (suppress an increase in the amount of the heat insulating member) as compared with the case where the heat insulating member is also provided between the second end portions adjacent to each other in the first direction.

In the battery pack according to the first aspect above, the battery pack may be configured to be mounted on a rover that travels on a lunar surface.

Since there is no air on the moon, the amount of heat released from the battery cell is smaller than that on the ground. Since the amount of heat released from the battery cell is small, heat is relatively easily transferred from one battery cell to an adjacent battery cell. In other words, heat dissipation paths are likely to be formed between the adjacent battery cells. Therefore, the suppression of heat transfer between the first end portions by the first shielding plate is particularly effective for suppressing the temperature rise of the battery cells when the battery pack is mounted on the rover traveling on the lunar surface.

A vehicle according to a second aspect of the present disclosure is equipped with the battery pack according to the first aspect. According to such a configuration, it is possible to provide a vehicle capable of suppressing the size of the heat insulating member from becoming large (suppress an increase in the amount of the heat insulating member) as compared with the case where the heat insulating member is also provided between the first end portions adjacent to each other in the first direction.

According to the present disclosure, it is possible to suppress the heat insulating member from becoming large.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
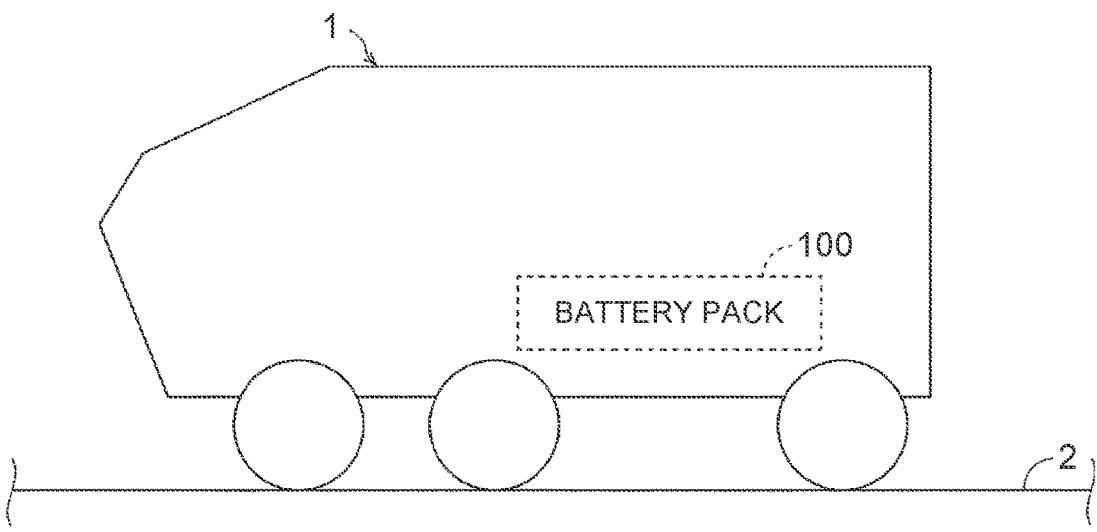
FIG. 1 is a diagram showing a lunar rover to which a battery pack according to an embodiment is mounted.

Hereinafter, an embodiment of the present disclosure will be described in detail with reference to the drawings. The same or corresponding parts in the drawings are designated by the same reference characters and repetitive description will be omitted.

FIG. 1 is a diagram showing the configuration of a lunar rover 1 according to the present embodiment. The lunar rover 1 travels on a lunar surface 2. The lunar rover 1 is a vehicle for exploring the lunar surface 2. It should be noted that the lunar rover 1 is an example of a "rover" and a "vehicle" of the present disclosure.

The lunar rover 1 includes a battery pack 100 mounted therein. The lunar rover 1 travels using electric power from the battery pack 100.

Figure 2:
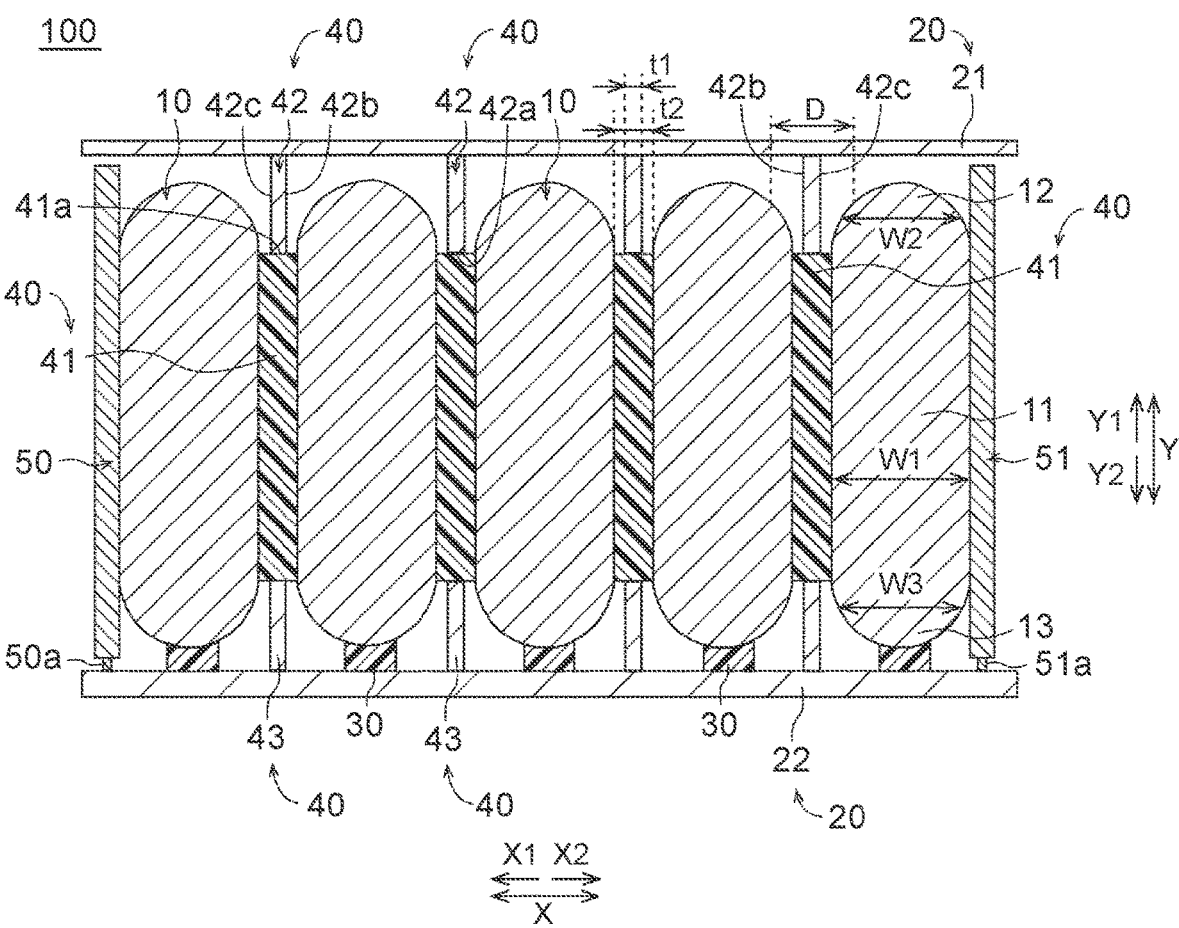
FIG. 2 is a sectional view showing the configuration of the battery pack according to the embodiment.

As shown in FIG. 2, the battery pack 100 includes a plurality of battery cells stacked together. FIG. 2 shows an example in which five battery cells 10 are disposed side by side along an X direction. It should be noted that the battery cells 10 have the same configuration as each other. The X direction is an example of a "first direction" of the present disclosure.

Each of the battery cells 10 includes a flat portion 11, a curved portion 12, and a curved portion 13. The curved portion 12 is located at an end portion of the battery cell 10 on the Y1 side. The curved portion 13 is located at an end portion of the battery cell on the Y2 side. The flat portion 11 is provided between the curved portion 12 and the curved portion 13. It should be noted that the curved portion 12 and the curved portion 13 have the same shape. Further, a Y direction is a direction orthogonal to the X direction, and is an example of a "second direction" of the present disclosure. Further, the flat portion 11 is an example of an "intermediate portion" of the present disclosure. Further, the curved portion 12 and the curved portion 13 are examples of a "first end portion" and a "second end portion" of the present disclosure, respectively. Further, the curved portion 12 is an example of a "narrow portion" of the present disclosure.

The flat portion 11 has a constant width W1 in the X direction. Further, a width W2 of the curved portion 12 in the X direction is smaller than the width W1 of the flat portion 11. Further, a width W3 of the curved portion 13 in the X direction is smaller than the width W1 of the flat portion 11.

Each of the curved portion 12 and the curved portion 13 has a semicircular shape in a sectional view along an XY plane (the sectional view shown in FIG. 2). With the above, the mechanical strength of the battery cell 10 can be increased and the weight of the battery cell 10 can be reduced as compared with the case where the battery cell 10 has a rectangular shape. It should be noted that the Y direction is a direction orthogonal to the X direction.

The battery pack 100 also includes a case 20 that accommodates the battery cells 10. The case 20 includes an upper case 21 provided on the Y1 side of the battery cells 10. Further, the case 20 includes a lower case 22 provided on the Y2 side of the battery cells Each of the upper case 21 and the lower case 22 is provided to extend along the X direction. Each of the battery cells 10 is in contact with the lower case 22. Each of the upper case 21 and the lower case 22 has a plate shape. It should be noted that the case 20 (21, 22) is made of aluminum, for example.

Each of the battery cells 10 and the lower case 22 are in contact with each other via a heat conductor 30. The heat conductor 30 conducts heat between the battery cell and the lower case 22. The heat conductor 30 is made of, for example, a resin or the like having relatively low thermal resistance (relatively high thermal conductivity) and relatively high elasticity (viscosity). Even when there are variations in size, disposition position, etc. among the battery cells 10, the heat conductor 30 can absorb the variations due to the relatively high elasticity (viscosity) of the heat conductor 30.

Further, the battery pack 100 also includes a plurality of separator portions each of which is provided between the battery cells 10 adjacent to each other. Each of the separator portions 40 includes a heat insulating member 41, a first shielding plate 42, and a second shielding plate 43. Each of the first shielding plate 42 and the second shielding plate 43 is provided separately from the heat insulating member 41. It should be noted that the first shielding plate 42 and the second shielding plate 43 have the same configuration.

The heat insulating member 41 is provided between the flat portions 11 adjacent to each other in the X direction. Specifically, the heat insulating member 41 is interposed between the flat portions 11 adjacent to each other in the X direction. The heat insulating member 41 is made of a foamed plastic-based heat insulating material, for example. It should be noted that the heat insulating member 41 may be made of a fiber-based heat insulating material.

The first shielding plate 42 is provided between the curved portions 12 adjacent to each other in the X direction. The first shielding plate 42 is provided so as to define (partition) between the curved portions 12 adjacent to each other in the X direction.

The second shielding plate 43 is provided between the curved portions 13 adjacent to each other in the X direction. The second shielding plate 43 is provided so as to define (partition) between the curved portions 13 adjacent to each other in the X direction.

The first shielding plate 42 is in contact with the case 20 (the upper case 21). Specifically, the first shielding plate 42 is provided so as to extend (project) from the upper case 21 toward the heat insulating member 41 side (the Y2 side). The first shielding plate 42 is fixed to the upper case 21 by welding, screw fastening, or the like. That is, the first shielding plate 42 and the upper case 21 are separate members from each other. It should be noted that the first shielding plate 42 and the upper case 21 may be integrally provided as a single member. The first shielding plate 42 is made of aluminum, for example. The thermal resistance of the first shielding plate 42 is smaller than that of the heat insulating member 41.

The second shielding plate 43 is provided so as to extend (project) from the lower case 22 toward the heat insulating member 41 side (the Y1 side). The second shielding plate 43 is fixed to the lower case 22 by welding, screw fastening, or the like. That is, the second shielding plate 43 and the lower case 22 are separate members from each other. It should be noted that the second shielding plate 43 and the lower case 22 may be integrally provided as a single member.

In the present embodiment, the first shielding plate 42 and the curved portion 12 that are adjacent to each other in the X direction are separated from each other. Specifically, a thickness t1 of the first shielding plate 42 in the X direction is smaller than a thickness t2 of the heat insulating member 41 in the X direction. Each of the thickness t1 of the first shielding plate 42 and the thickness t2 of the heat insulating member 41 is constant. Further, a distance D between the curved portions 12 adjacent to each other gradually increases toward the Y1 side. The thickness t1 of the first shielding plate 42 is smaller than the minimum value of the distance D.

Further, similar to the first shielding plate 42 and the curved portion 12, the second shielding plate 43 and the curved portion 13 adjacent to each other in the X direction are separated from each other. It should be noted that the detailed description will not be repeated because the description is the same as the description of the first shielding plate 42 and the curved portion 12.

Further, in the present embodiment, in each of the separator portions 40, the heat insulating member 41 and the first shielding plate 42 are in contact with each other. Specifically, an end surface 41a of the heat insulating member 41 on the first shielding plate 42 side (the Y1 side) and an end surface 42a of the first shielding plate 42 on the heat insulating member 41 side (the Y2 side) are in contact (in close contact) with each other.

Further, in each of the separator portions 40, the heat insulating member 41 and the second shielding plate 43 are in contact with each other. It should be noted that the detailed description will not be repeated because the description is the same as the description of the first shielding plate 42 and the heat insulating member 41.

Further, each of a plurality of the first shielding plates 42 includes a first surface 42b provided so as to face toward the battery cell 10 provided at the center in the X direction among the battery cells 10. Further, each of the first shielding plates 42 includes a second surface 42c opposite to (the back surface of) the first surface 42b. Specifically, in the example shown in FIG. 2, the first surfaces 42b are surfaces facing the X2 side and the second surfaces 42c are surfaces facing the X1 side in the two first shielding plates 42 on the X1 side. On the other hand, the first surfaces 42b are surfaces facing the X1 side, and the second surfaces 42c are surfaces facing the X2 side in the two first shielding plates 42 on the X2 side.

Here, in the present embodiment, an emissivity of the second surface 42c is higher than that of the first surface 42b. A heat capacity (heat capacity of the battery cell 10) closer to the battery cell 10 provided at the center in the X direction when viewed from each of the battery cells 10 is larger as compared with the opposite side. Therefore, making the emissivity of the second surface 42c higher than that of the first surface 42b makes it possible to more efficiently transfer the heat to the center side where the heat capacity is larger.

Figure 3:
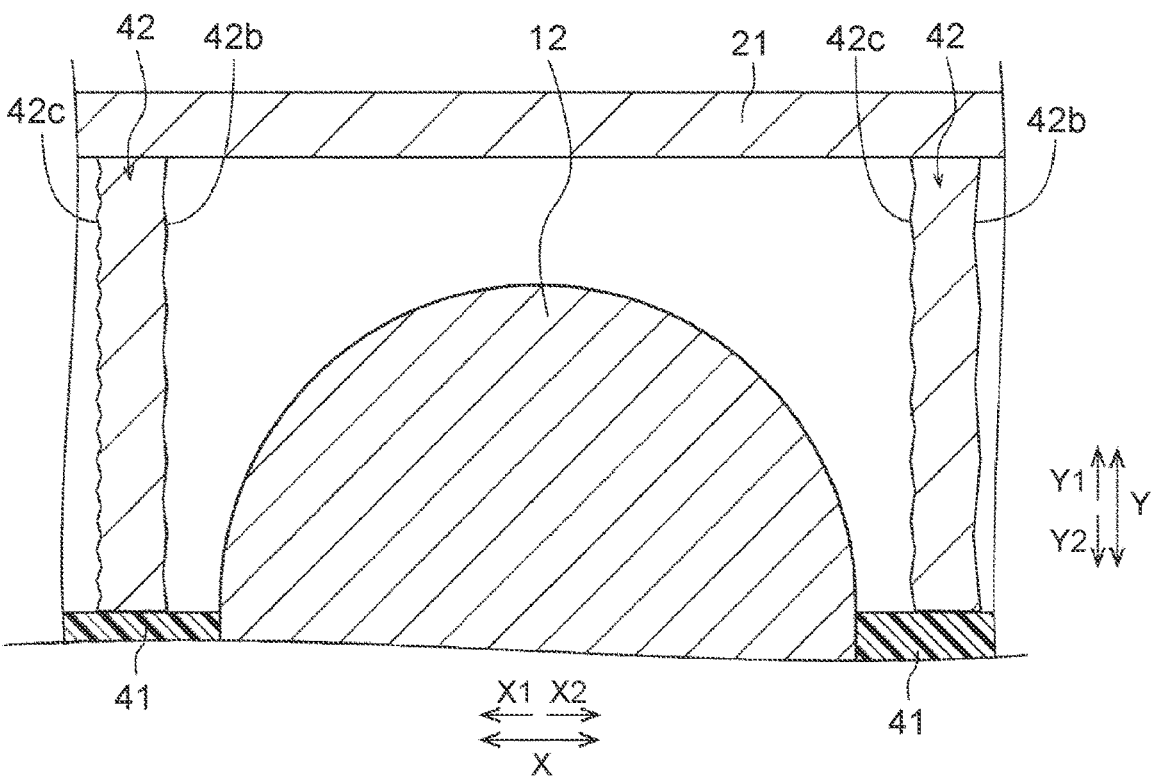
FIG. 3 is a partial enlarged view of the vicinity of a curved portion of the battery cell according to the embodiment.

Specifically, as shown in FIG. 3, each of the first surfaces 42b and the second surfaces 42c is made uneven. The first shielding plates 42 are each formed such that a surface roughness of the second surface 42c is larger than a surface roughness of the first surface 42b. With the above, the emissivity of the second surface 42c is higher than that of the first surface 42b. It should be noted that the detailed description will not be repeated because the second shielding plate 43 is also configured in the same manner as the first shielding plate 42.

Further, among the first shielding plates 42, the first shielding plate 42 disposed closer to the battery cell 10 at the center has a lower emissivity. In other words, among the first shielding plates 42, the first shielding plate 42 disposed closer to the end portion in the X direction has a higher emissivity. This makes it possible to even more efficiently transfer the heat to the center side where the heat capacity is larger.

In FIG. 3, it is assumed that the first shielding plate 42 on the X2 side is disposed closer to the battery cell 10 at the center than the first shielding plate 42 on the X1 side. In this case, the first surface 42b of the first shielding plate 42 on the X1 side has a larger surface roughness and a higher emissivity than the first surface 42b of the first shielding plate 42 on the X2 side. Further, the second surface 42c of the first shielding plate 42 on the X1 side has a larger surface roughness and a higher emissivity than the second surface 42$c$ of the first shielding plate 42 on the X2 side. It should be noted that the same applies to a plurality of the second shielding plates 43 as well.

Figure 4:
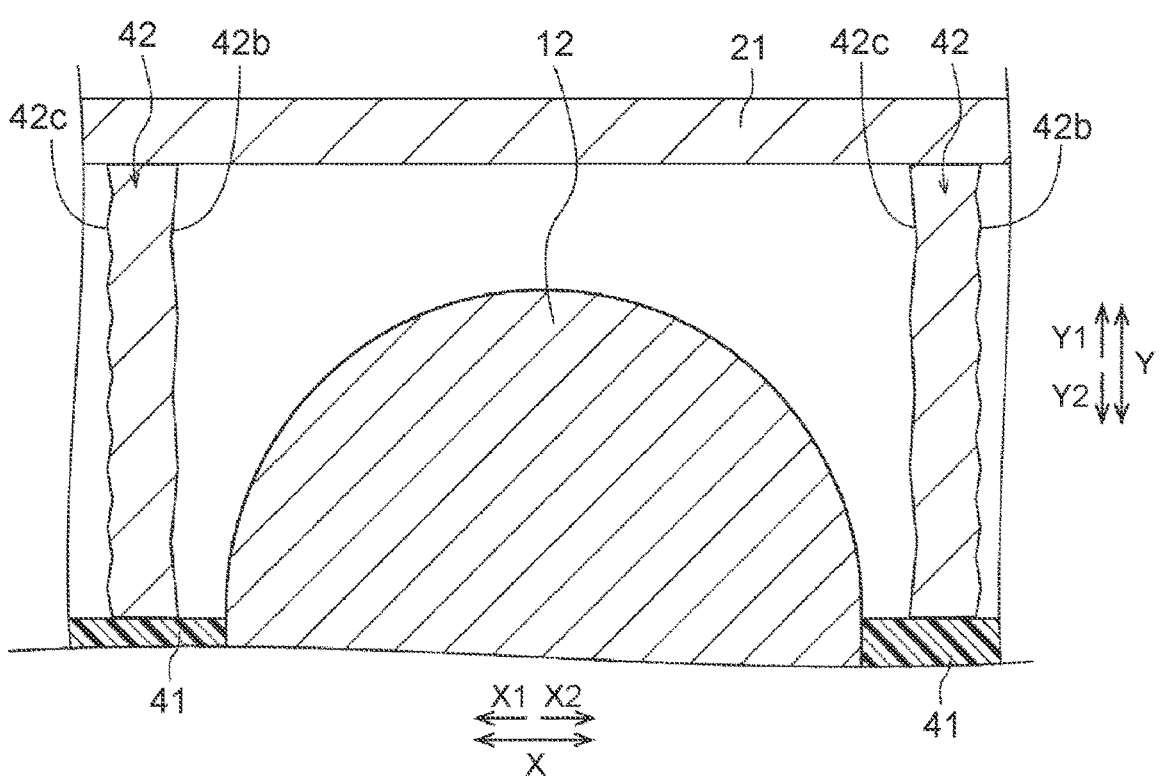
FIG. 4 is a partial enlarged view of the vicinity of the curved portion of the battery cell at the center according to the embodiment.

Further, as shown in FIG. 4, the two first shielding plates 42 provided so as to interpose the battery cell 10 (the curved portion 12) at the center are only provided with their directions reversed to each other, and have the same configuration. Specifically, the first surface 42$b$ of the first shielding plate 42 on the X1 side and the second surface 42$c$ of the first shielding plate 42 on the X2 side in FIG. 4 have the same surface roughness (emissivity). Further, the second surface 42$c$ of the first shielding plate 42 on the X1 side and the first surface 42$b$ of the first shielding plate 42 on the X2 side have the same surface roughness (emissivity). It should be noted that the same applies to the two second shielding plates 43 that interpose the battery cell 10 at the center. It also should be noted that the first shielding plate 42 (the second shielding plate 43) closest to the X1 side and the first shielding plate 42 (the second shielding plate 43) closest to the X2 side may be provided with their directions reversed to each other, and may have the same configuration as each other.

Further, as shown in FIG. 2, the battery pack 100 includes an end plate 50 provided on the X1 side with respect to the battery cell 10 closest to the X1 side. The end plate 50 is provided so as to cover the entire battery cell 10 closest to the X1 side from the X1 side. Further, the end plate 50 and the battery cell 10 (the flat portion 11) closest to the X1 side are in contact (in close contact) with each other. It should be noted that the end plate 50 is made of aluminum, for example.

Further, the battery pack 100 also includes an end plate 51 disposed on the X2 side of the battery cell 10 closest to the X2 side. The end plate 51 is provided so as to cover the entire battery cell 10 closest to the X2 side from the X2 side. Further, the end plate 51 and the battery cell 10 (the flat portion 11) closest to the X2 side are in contact (in close contact) with each other. It should be noted that the end plate 51 is made of aluminum, for example.

Further, each of the end plate 50 and the end plate 51 is fixed to the lower case 22. A connecting portion 50$a$ connected to the lower case 22 is provided at an end portion of the end plate 50 on the lower case 22 side (the Y2 side). A connecting portion 51$a$ connected to the lower case 22 is provided at an end portion of the end plate 51 on the lower case 22 side (the Y2 side). It should be noted that the end plate 50 (51) is fixed to the lower case 22 by fastening or welding the connecting portion 50$a$ (51$a$) to the lower case 22.

As described above, in the present embodiment, each of the separator portions 40 includes the heat insulating member 41 provided between the flat portions 11 adjacent to each other in the X direction, and the first shielding plate 42 that is separately provided from the heat insulating member 41 between the curved portions 12 adjacent to each other in the X direction. With the above, the first shielding plate 42 is provided between the curved portions 12, and therefore it is not necessary to use a heat insulating member to block radiant heat between the curved portions 12. As a result, it is possible to suppress the size of the heat insulating member from becoming large.

Further, in the above-described embodiment, an example in which the first shielding plate 42 and the curved portion 12 adjacent to each other are separated from each other has been shown. However, the present disclosure is not limited to this. The first shielding plate and the curved portion 12 may be in contact with each other.

Figure 5:
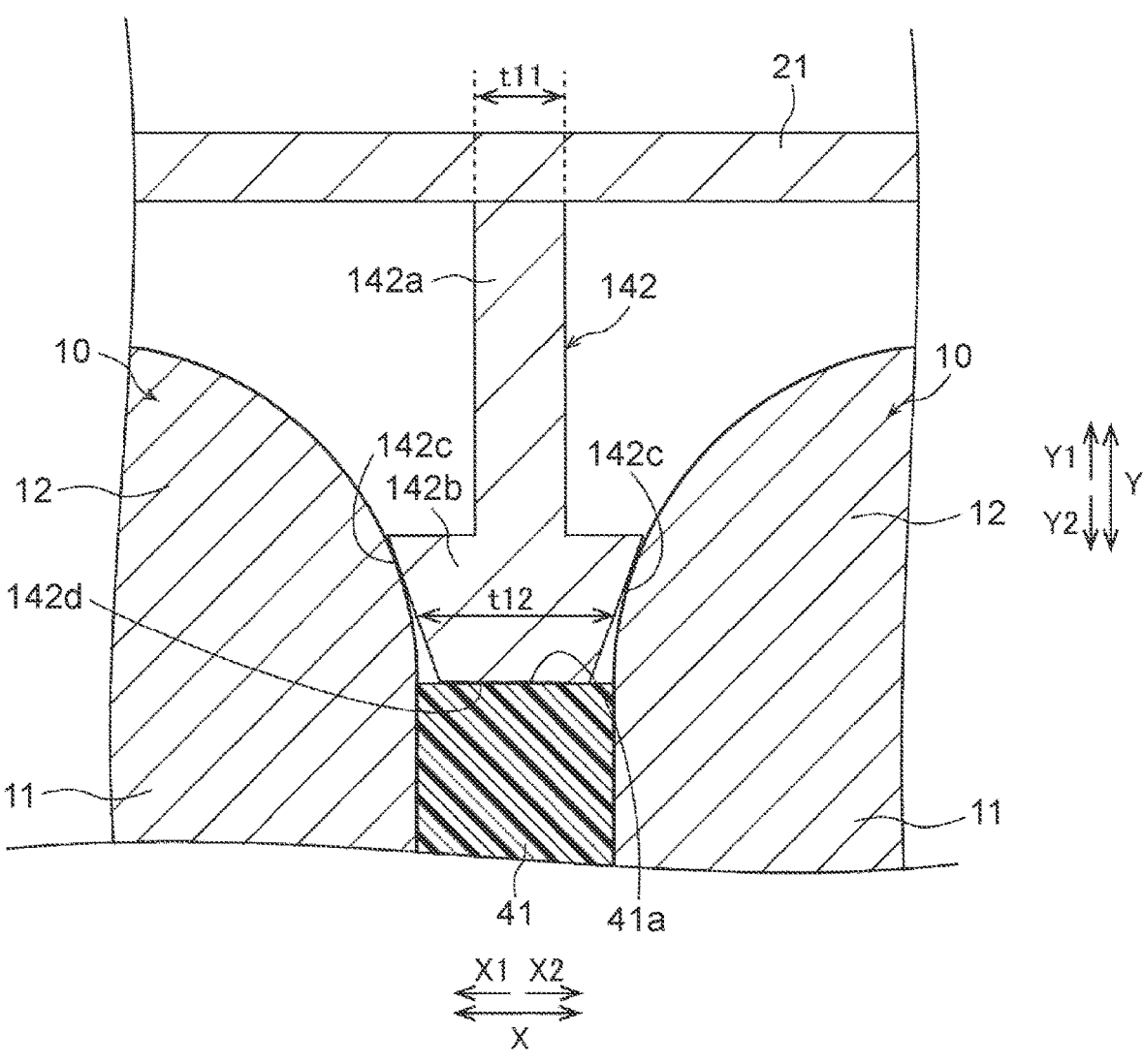
FIG. 5 is a sectional view showing the configuration of a first shielding plate according to a first modification of the embodiment.

Specifically, as shown in FIG. 5, a first shielding plate 142 is in contact with each of the curved portion 12 on the X1 side and the curved portion 12 on the X2 side. The first shielding plate 142 includes a portion 142$a$ extending from the upper case 21 toward the Y2 side, and a portion 142$b$ interposed between the portion 142$a$ and the heat insulating member 41 in the Y direction.

A thickness t11 of the portion 142$a$ in the X direction is constant. That is, the portion 142$a$ has a flat shape. Further, a thickness t12 of the portion 142$b$ in the X direction gradually decreases toward the heat insulating member 41 side (the Y2 side). The portion 142$b$ has a tapered shape that tapers toward the heat insulating member 41 side (the Y2 side). Specifically, the portion 142$b$ includes a pair of inclined surfaces 142$c$. The inclined surfaces 142$c$ are in contact with the curved portion 12 on the X1 side and the curved portion 12 on the X2 side, respectively. Each of the inclined surfaces 142$c$ is formed in a flat surface shape. It should be noted that each of the inclined surfaces 142$c$ may be formed in a curved surface shape. Further, an end surface 142$d$ of the portion 142$b$ on the Y2 side and the end surface 41$a$ of the heat insulating member 41 on the Y1 side are in contact (in close contact) with each other.

With the configuration above, it is possible to effectively transfer (release) the heat of the battery cells 10 to the upper case 21 via the first shielding plate 142.

Figure 6:
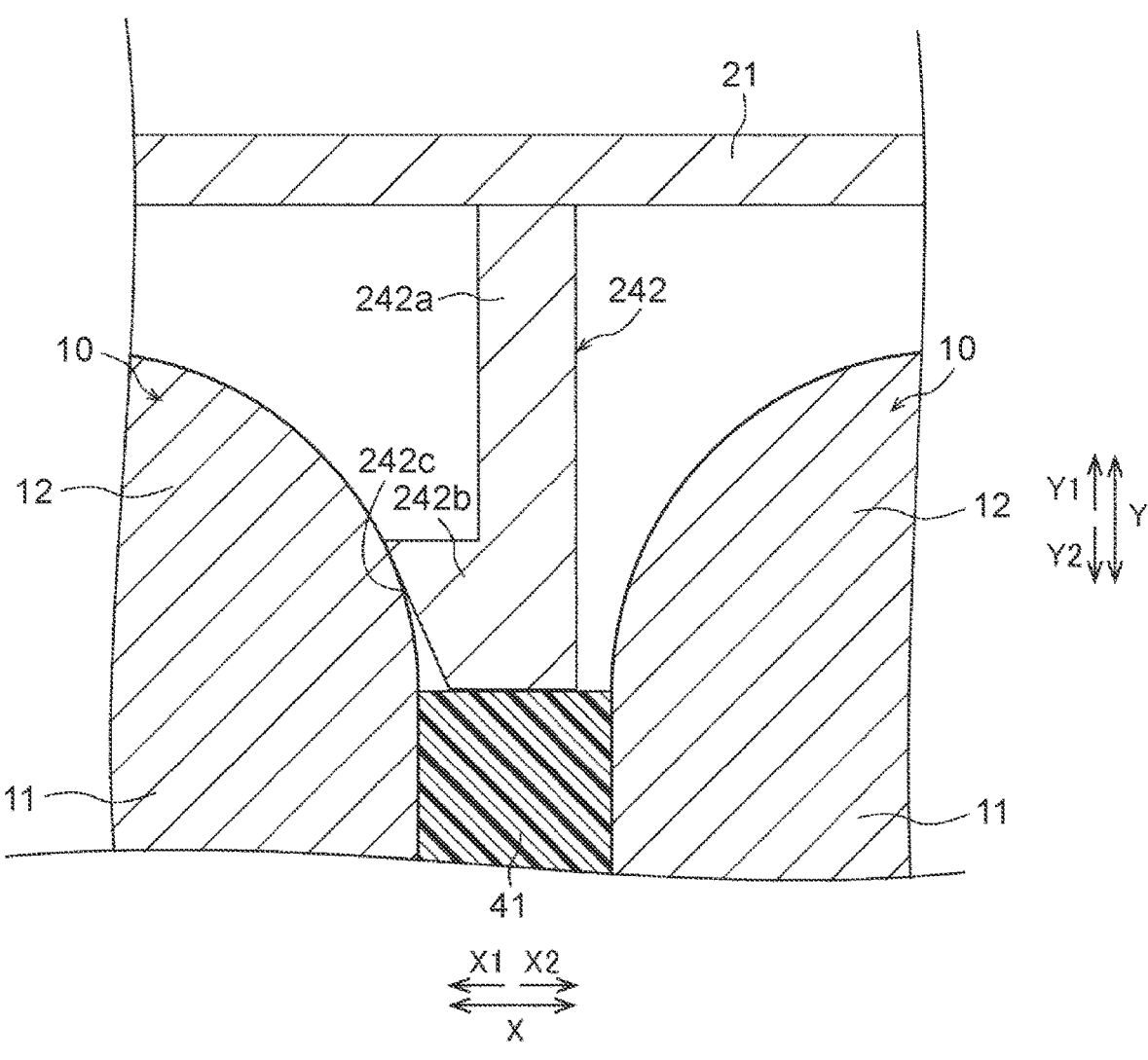
FIG. 6 is a sectional view showing the configuration of a first shielding plate according to a second modification of the embodiment.

Further, a first shielding plate 242 shown in FIG. 6 is a modification of the first shielding plate 142 shown in FIG. 5. The first shielding plate 242 is in contact only with the curved portion 12 of the battery cell 10 on the X1 side (the battery cell 10 on the opposite side to the battery cell 10 at the center) of the two adjacent curved portions 12. The first shielding plate 242 includes a flat portion 242$a$ and a portion 242$b$ that is tapered. The portion 242$b$ includes an inclined surface 242$c$ that is in contact with the curved portion 12 on the X1 side. With the above, the heat of the battery cell 10 on the opposite side to the battery cell 10 at the center can be easily transferred toward the battery cell 10 at the center having a large heat capacity.

It should be noted that the configurations of the first shielding plate 142 and the first shielding plate 242 shown in FIGS. 5 and 6 may be applied to the second shielding plate.

Further, the example in which the battery cell 10 includes the curved portion 12 and the curved portion 13 has been described in the above embodiment. However, the present disclosure is not limited to this. For example, the battery cell may be composed only of the flat portion.

Further, in the above-described embodiment, an example in which each of the first shielding plate 42 and the second shielding plate 43 is in contact with the heat insulating member 41 has been shown. However, the present disclosure is not limited to this. At least one of the first shielding plate 42 and the second shielding plate 43 does not have to be in contact with the heat insulating member 41.

Further, in the above-described embodiment, an example in which the first surface 42$b$ and the second surface 42$c$ of the first shielding plate 42 have different emissivity from each other by varying surface roughness due to unevenness from each other has been described. However, the present disclosure is not limited to this. For example, the first surface 42$b$ and the second surface 42$c$ may have different emissivity from each other depending on the glossiness, the oxidation state, the staining state, and the like. Further, the first shielding plate provided with a first surface and a second surface having different emissivity from each other may be formed by bonding plate members having different emissivity from each other.

Further, in the above-described embodiment, an example in which the battery pack 100 is mounted on the lunar rover 1 has been described. However, the present disclosure is not limited to this. For example, the battery pack 100 may be mounted on a ground vehicle.

It should be noted that the configurations described in the above embodiment and the various modifications described above may be arbitrarily combined and implemented.

The embodiment disclosed herein should be considered as illustrative and not restrictive in all respects. The scope of the present disclosure is shown by the claims, rather than the above embodiment, and is intended to include all modifications within the meaning and the scope equivalent to those of the claims.

What is claimed is:

1. A battery pack comprising:

a plurality of battery cells stacked together in a first direction and each configured to include a first end portion located at one end in a second direction orthogonal to the first direction, a second end portion located at another end in the second direction, and an intermediate portion provided between the first end portion and the second end portion; and a plurality of separator portions, each including a heat insulating member provided between the intermediate portions adjacent to each other in the first direction and a first shielding plate provided between the first end portions adjacent to each other in the first direction, and each provided between the battery cells adjacent to each other, wherein the first shielding plate includes a first surface provided so as to face toward the battery cell provided at a center in the first direction among the battery cells, and a second surface opposite to the first surface; and wherein an emissivity of the second surface is larger than an emissivity of the first surface.

2. The battery pack according to claim 1, wherein the first shielding plate has a thermal resistance smaller than a thermal resistance of the heat insulating member.

3. The battery pack according to claim 1, wherein:

the intermediate portion includes a flat portion with a constant width in the first direction;

the first end portion includes a narrow portion with a smaller width than a width of the flat portion in the first direction; and the first shielding plate is provided between the narrow portions adjacent to each other in the first direction.

4. The battery pack according to claim 1, further comprising a case that accommodates the battery cells, wherein the first shielding plate is configured to be in contact with the case at an end portion of the first shielding plate in the second direction.

5. The battery pack according to claim 4, further comprising an elastic body that brings the second end portion and the case into contact with each other so as to be thermally conductive.

6. The battery pack according to claim 1, wherein the first shielding plate and the first end portion adjacent to each other in the first direction are separated from each other.

7. The battery pack according to claim 1, wherein the first shielding plate is configured such that a thickness of the first shielding plate is smaller than a thickness of the heat insulating member.

8. The battery pack according to claim 1, wherein the first shielding plate and at least one of two of the first end portions adjacent to the first shielding plate in the first direction are in contact with each other.

9. The battery pack according to claim 1, wherein the heat insulating member and the first shielding plate are in contact with each other in each of the separator portions.

10. The battery pack according to claim 1, wherein each of the separator portions includes a second shielding plate provided between the second end portions adjacent to each other in the first direction.

11. The battery pack according to claim 1, wherein the battery pack is configured to be mounted on a rover that travels on a lunar surface.

12. A vehicle equipped with the battery pack according to claim 1.

* * * * *